United States Patent
Katayama (10) Patent No.: US 10,741,867 B2
(45) Date of Patent: Aug. 11, 2020

(54) FUEL CELL MODULE

(71) Applicant: TOYOTA JIDOSHA KABUSHIKI KAISHA, Toyota-shi, Aichi (JP)

(72) Inventor: Masahiro Katayama, Seto (JP)

( * ) Notice: Subject to any disclaimer, the term of this patent is extended or adjusted under 35 U.S.C. 154(b) by 8 days.

(21) Appl. No.: 16/195,198

(22) Filed: Nov. 19, 2018

(65) Prior Publication Data
US 2019/0181486 A1  Jun. 13, 2019

(30) Foreign Application Priority Data
Dec. 8, 2017 (JP) .................................. 2017-235954

(51) Int. Cl.
*H01M 8/2475* (2016.01)

(52) U.S. Cl.
CPC ...... *H01M 8/2475* (2013.01); *H01M 2250/20* (2013.01)

(58) Field of Classification Search
CPC ........................ H01M 8/2475; H01M 2250/20
See application file for complete search history.

(56) References Cited

U.S. PATENT DOCUMENTS

| | | | | |
|---|---|---|---|---|
| RE42,720 E | * | 9/2011 | Tanaka | H01M 8/04067 429/469 |
| 2003/0027031 A1 | * | 2/2003 | Baldauf | H01M 8/0271 429/457 |
| 2007/0224469 A1 | * | 9/2007 | Isozaki | C01B 3/326 429/412 |
| 2010/0086813 A1 | * | 4/2010 | Yamamoto | B01J 8/0438 429/434 |
| 2016/0126563 A1 | | 5/2016 | Hotta et al. | |

FOREIGN PATENT DOCUMENTS

| | | |
|---|---|---|
| JP | 2005-149732 A | 6/2005 |
| JP | 2009-301923 A | 12/2009 |
| JP | 2015-170545 A | 9/2015 |
| JP | 2016-091792 A | 5/2016 |
| JP | 2017-091644 A | 5/2017 |
| JP | 2017-142928 A | 8/2017 |

* cited by examiner

*Primary Examiner* — Lisa S Park
(74) *Attorney, Agent, or Firm* — Dickinson Wright PLLC

(57) ABSTRACT

A fuel cell module can prevent excessive extending of crack in a cleavage part when the cleavage part cleaves to reduce internal pressure of the housing that stores the fuel cell stack and can prevent the exposure of a high-voltage part inside of the housing. The fuel cell module includes a fuel cell stack and a housing that stores the fuel cell stack. The housing includes a partition wall, a cleavage part on the partition wall that cleaves when the internal pressure of the housing increases to a predetermined pressure, a high-rigidity part on the partition wall to surround the cleavage part, and a plurality of elongated protrusions on the partition wall outside of the high-rigidity part. The strength of the cleavage part is lower than the elongated protrusions and the strength of the high-rigidity part is higher than the elongated protrusions and can prevent extension of a crack in the cleavage part.

10 Claims, 7 Drawing Sheets

FUEL CELL MODULE

CROSS REFERENCE TO RELATED APPLICATIONS

The present application claims priority from Japanese patent application JP 2017-235954 filed on Dec. 8, 2017 the content of which is hereby incorporated by reference into this application.

BACKGROUND

Technical Field

The present disclosure relates to fuel cell modules.

Background Art

Conventionally inventions about a fuel cell including a case to store a fuel cell stack have been known (see JP 2009-301923 A). The fuel cell described in JP 2009-301923 A includes a fuel cell stack, a fuel cell case to store this fuel cell stack, and an insulating member.

Such a fuel cell case has a pressure-reduction means to reduce the internal pressure of the case. The pressure-reduction means forms an opening when the internal pressure of the case exceeds a predetermined value. The fuel cell has the insulating member on the fuel cell stack at a position opposed to the opening when the fuel cell stack is stored in the fuel cell case. Such a conventional fuel cell is configured so that the distance between a part of the fuel cell case surrounding the opening and the insulating member is larger than the distance between a part other than the surrounding part and the fuel cell stack.

With this configuration, the fuel cell can reduce the pressure which is applied to the insulating member when the internal pressure of the fuel cell case decreases. In this way, this fuel cell can suppress damage of the insulating member or separation of the insulating member from the fuel cell stack. An operator therefore can handle the fuel cell safely without protective equipment, and so the operability can improve. Since the distance between the fuel cell case and the fuel cell stack is shorter than the distance between the fuel cell case and the insulating member at a part other than the surrounding part of the opening, the fuel cell can be compact.

SUMMARY

The conventional fuel cell includes a rupture disc as the pressure-reduction means, which ruptures when receiving the set pressure. Such a pressure-reduction means may generate a crack during rupture that extends to the fuel cell case beyond the pressure-reduction means. In that case, such a crack of the fuel cell case may expose a high-voltage part including a single cell of the fuel cell stack stored in the fuel cell case.

The present disclosure provides a fuel cell module capable of preventing the excessive extending of a crack in a cleavage part when the cleavage part cleaves to reduce the internal pressure of the housing that stores the fuel cell stack and of preventing the exposure of a high-voltage part inside of the housing.

According to one aspect of the present disclosure, a fuel cell module includes a fuel cell stack; and a housing that stores the fuel cell stack. The housing includes a partition wall, a cleavage part on the partition wall that cleaves when an internal pressure of the housing increases to a predetermined pressure, a high-rigidity part on the partition wall to surround the cleavage part, and a plurality of elongated protrusions on the partition wall outside of the high-rigidity part. The cleavage part has strength lower than strength of the elongated protrusions and the high-rigidity part has strength higher than the strength of the elongated protrusions and that can prevent extension of a crack in the cleavage part.

In the fuel cell module of this aspect, the cleavage part on the partition wall of the housing has strength lower than strength of the elongated protrusions on the partition wall outside of the high-rigidity part that surrounds the cleavage part, and the high-rigidity part has strength higher than the strength of the elongated protrusions. With this configuration, when the internal pressure of the housing increases to a predetermined pressure, a crack is generated at the cleavage part having the lowest strength prior to at the elongated protrusions and the high-rigidity part, and the cleavage part cleaves. This can release gas inside of the housing from the crack of the cleavage part and can suppress an increase of the internal pressure of the housing. In this way, the safety of the fuel cell module can be secured.

The strength of the high-rigidity part that surrounds the cleavage part is higher than the strength of the elongated protrusions and can prevent the extension of a crack in the cleavage part. This can prevent a crack generated at the cleavage part and reaching the high-rigidity part from extending beyond the high-rigidity part. This can prevent the exposure of the high-voltage part, which includes single cells of the fuel cell stack stored inside of the housing, due to an excessively extending crack. The strength of these parts means bending rigidity of the parts, for example.

The housing is made of metal, such as aluminum. More specifically, the housing is made of a brittle material, such as cast aluminum. In this way, for the housing made of cast aluminum, the number of the components can be reduced by casting the partition wall having the cleavage part, the high-rigidity part and the elongated protrusions, and so the manufacturing cost can be reduced. Such a housing can be lighter in weight.

When the housing is made of a brittle material, such as cast aluminum, a crack in the cleavage part extends instantly. The high-rigidity part surrounding the cleavage part can prevent a crack from extending beyond the cleavage part.

The fuel cell module according to the above aspect further includes an insulating member between the housing and a high-voltage part including single cells of the fuel cell stack, for example. The insulating member covers the high-voltage part at least at a region opposed to the cleavage part and exposes a part of the high-voltage part at a region other than the region opposed to the cleavage part.

In this way, the insulating member covers the high-voltage part stored inside of the housing at least at a region opposed to the cleavage part. This can prevent the exposure of the high-voltage part due to a crack generated during cleaving of the cleavage part. This can reduce the risk of a contact between the high-voltage part and a human or components outside of the housing during cleaving of the cleavage part.

The high-voltage part includes a plurality of single cells, i.e., fuel cells, that are stacked as components of the fuel cell stack and terminal plates at both ends of the fuel cell stack in the stacking direction of the single cells, for example. These terminal plates are connected to the single cells at both ends of the plurality of single cells in the stacking direction, for example. The terminal plates are configured to draw the electricity generated by the plurality of single cells to the outside.

The insulating member includes an insulating sheet and an insulating plate that are made of resin having an electrical insulating property, for example. The insulating sheet is placed between the single cells and the housing so as to cover the fuel cell stack, for example. The insulating plate is placed between one of the terminal plates and the housing and between the other terminal plate and a pressurizing plate, for example. The pressurizing plate pressurizes the fuel cell stack in the stacking direction of the single cells.

In the fuel cell module according to the above aspect, the high-rigidity part has a thickness 7.5 times or more the thickness of the cleavage part, for example. With this configuration, the high-rigidity part can have sufficient strength. In the ignition test to ignite hydrogen gas charged in the housing to increase the internal pressure of the housing and so cleave the cleavage part, the high-rigidity part can prevent the extension of a crack in the cleavage part reliably.

In the fuel cell module according to the above embodiment, the plurality of elongated protrusions protrudes from an outer surface of the partition wall in a thickness direction of the partition wall and the elongated protrusions have a grid-like shape that extends vertically and horizontally along the outer surface of the partition wall, for example. This reinforces a part of the partition wall other than the high-rigidity part and the cleavage part with the grid-like elongated protrusions, and so the strength of the partition wall improves. This can prevent a breakage of the partition wall at a part other than the cleavage part before the internal pressure of the housing increases to a predetermined pressure to cleave the cleavage part.

In the fuel cell module according to the above aspect, the partition wall is the thinnest at the cleavage part, and the high-rigidity part has a thickness larger than a thickness of the elongated protrusions, for example. This means that the strength of the cleavage part is lower than the strength of the elongated protrusions and the strength of the high-rigidity part is higher than the strength of the elongated protrusions.

In the fuel cell module according to the above aspect, the cleavage part has a round shape and the high-rigidity part has an annular shape when the partition wall is viewed in a thickness direction, for example. This can suppress concentration of stress at the high-rigidity part when a crack occurs in any direction of the cleavage part, and so can prevent a crack in the high-rigidity part.

In the fuel cell module according to the above aspect, the cleavage part is opposed to an external structure, for example. The external structure includes a stack frame to support the fuel cell module, for example. In this way, the cleavage part is close to and opposed to an external structure, which can prevent flying of a broken piece during cleaving of the cleavage part. This also can reduce the risk of a contact between the high-voltage part in the housing and a human or components outside of the housing via a crack or an opening at the cleavage part.

These aspects of the present disclosure can provide a fuel cell module that can prevent the excessive extending of a crack in a cleavage part when the cleavage part cleaves to reduce the internal pressure of the housing that stores the fuel cell stack and can prevent the exposure of a high-voltage part inside of the housing.

DETAILED DESCRIPTION

The following describes an embodiment of the fuel cell module according to the present disclosure, with reference to the drawings.

Figure 1:
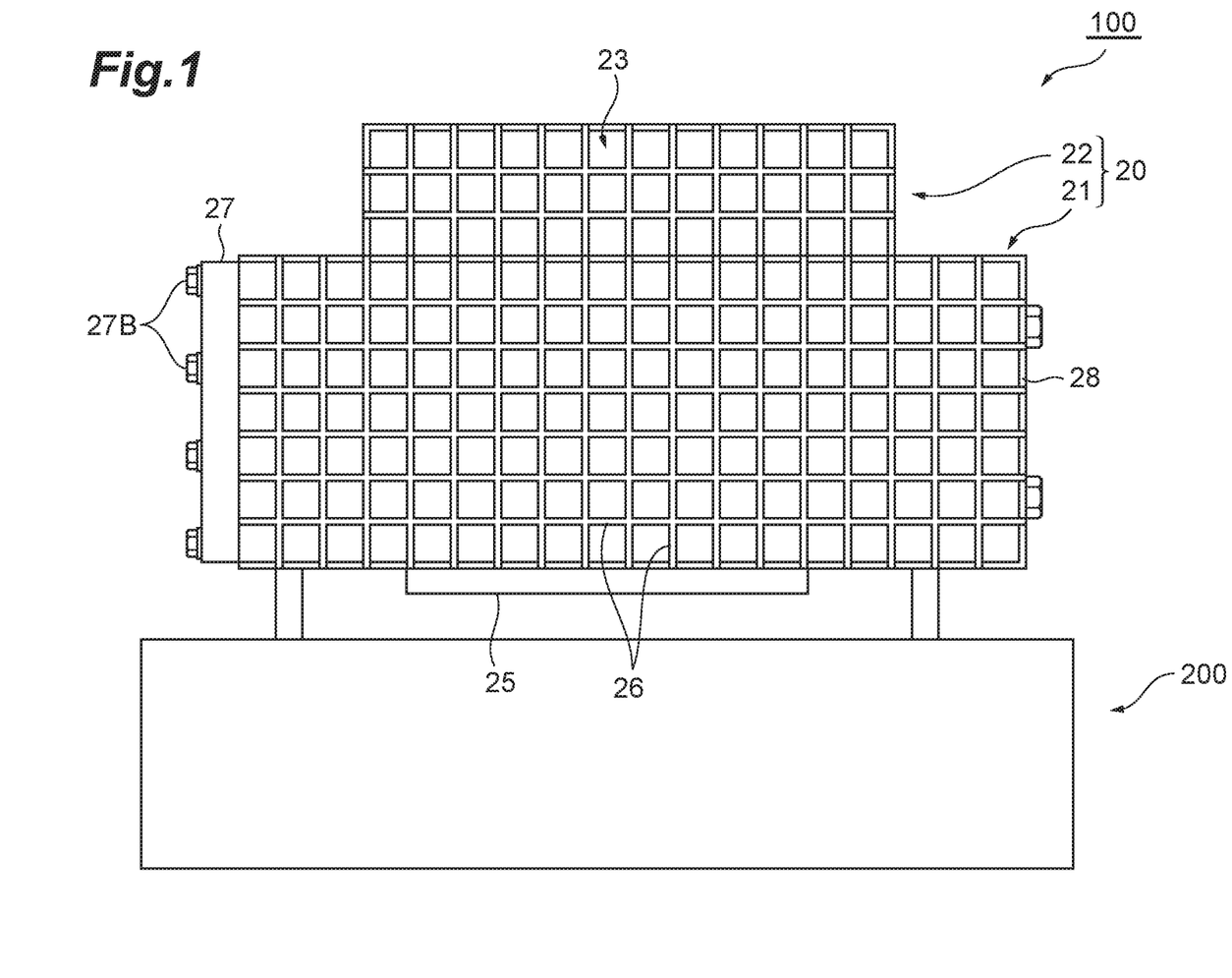
FIG. 1 is a front view of a fuel cell module according to one embodiment of the present disclosure.
Figure 2:
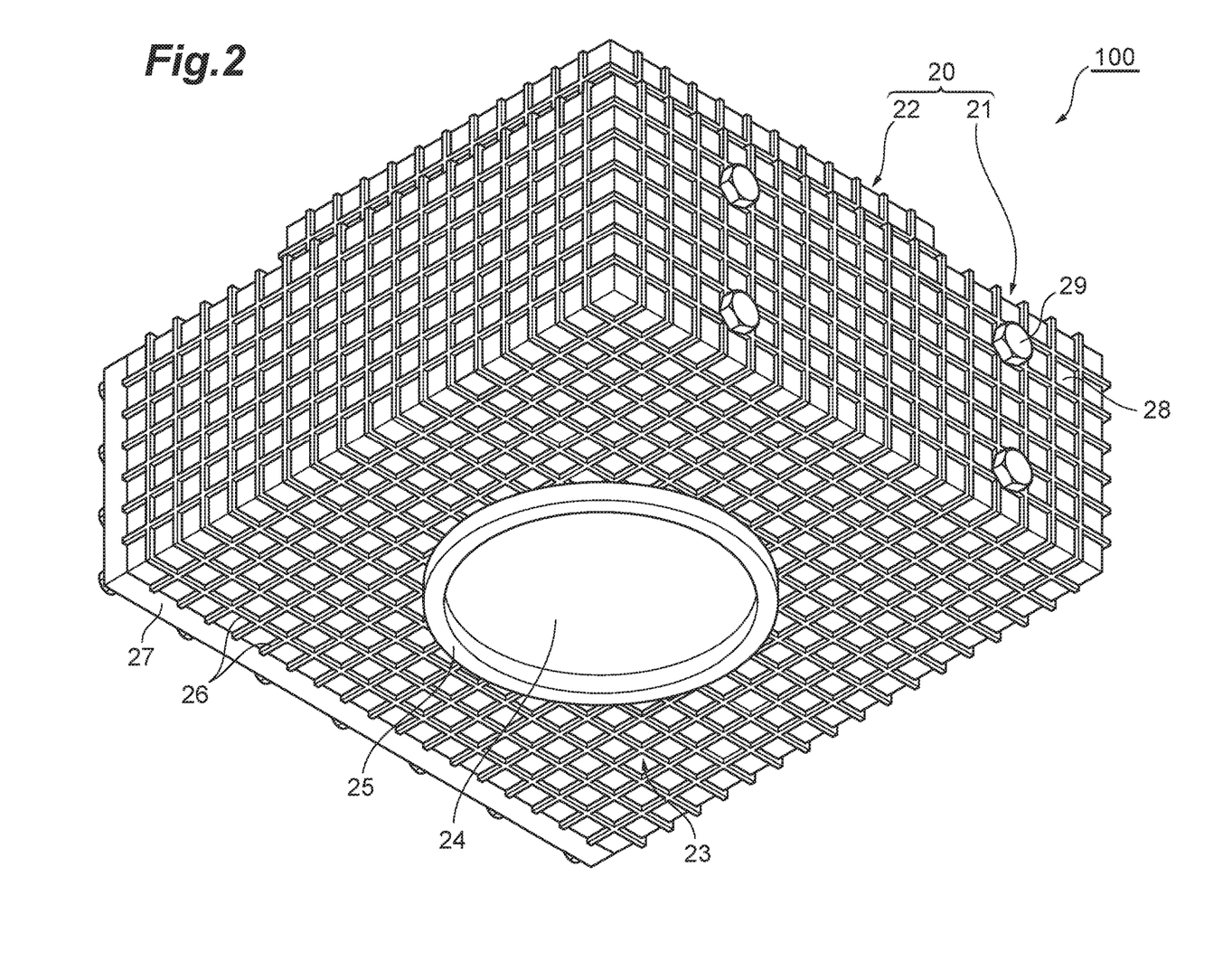
FIG. 2 is a perspective view of the fuel cell module in FIG. 1.
Figure 3:
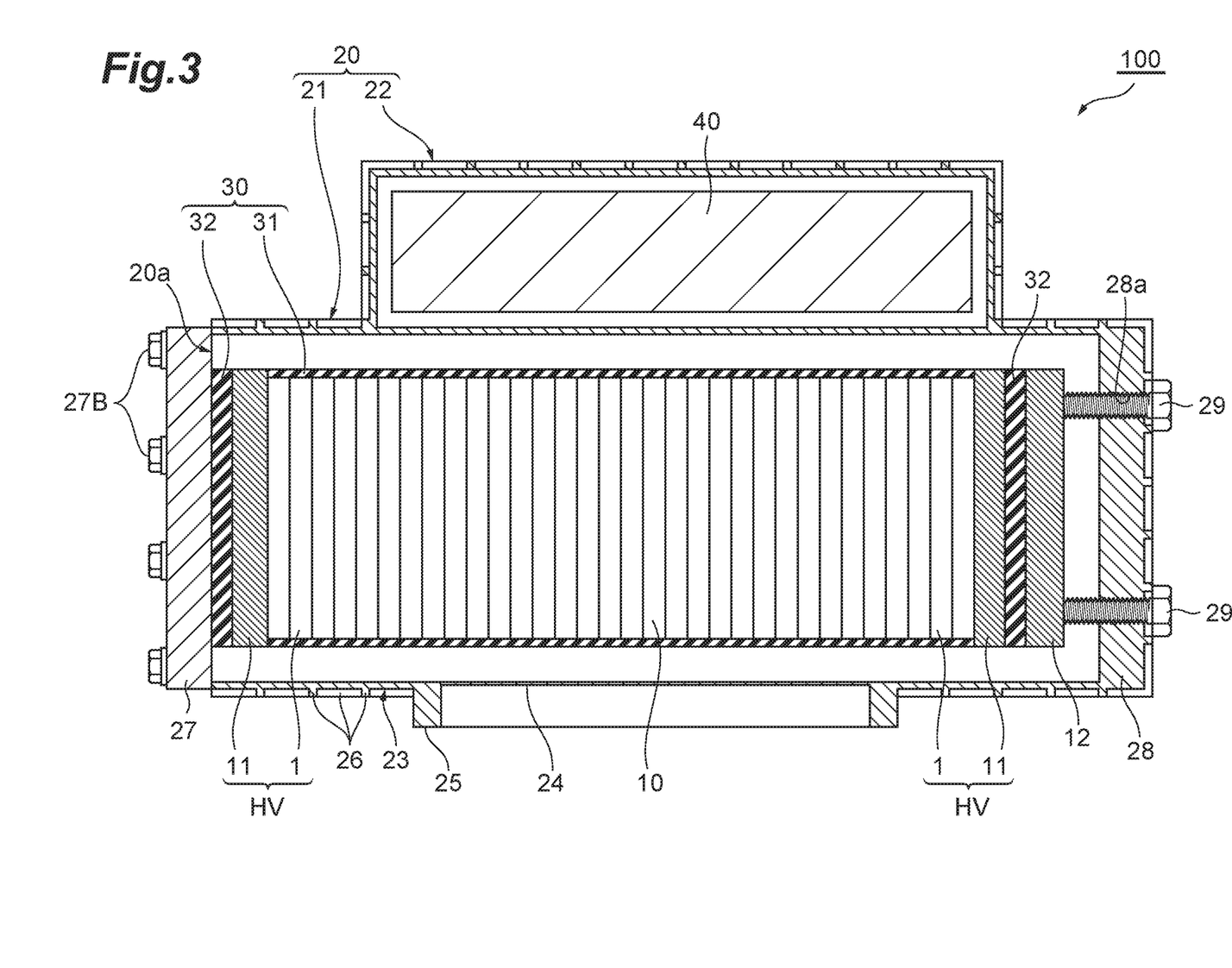
FIG. 3 is a cross-sectional view of the fuel cell module in FIG. 1.

FIG. 1 is a front view of a fuel cell module 100 according to one embodiment of the present disclosure. FIG. 2 is a perspective view of the fuel cell module 100 in FIG. 1. FIG. 3 is a cross-sectional view of the fuel cell module 100 in FIG. 1.

The fuel cell module 100 of the present embodiment is mounted in a fuel-cell vehicle, for example, and operates as a power supply for vehicle that supplies electricity to a motor to drive the fuel-cell vehicle. The fuel cell module 100 includes a fuel cell stack 10, and a housing 20 that stores this fuel cell stack 10, for example.

The fuel cell stack 10 includes a plurality of single cells 1, i.e., fuel cells that are stacked and are connected in series. At both ends of the fuel cell stack 10 in the stacking direction of the single cells 1, terminal plates 11 are placed. These terminal plates 11 are connected to the single cells 1 at both ends of the plurality of single cells 1 in the stacking direction, for example. The terminal plates are configured to draw the electricity generated by the plurality of single cells 1 to the outside.

In the fuel cell module 100 of the present embodiment, the single cells 1 of the fuel cell stack 10 and the terminal plates 11 at both ends of the fuel cell stack 10 are a part of a high-voltage part HV that is at higher electrical potential than other parts during the generation of electricity by the fuel cell stack 10. In an example of FIG. 3, the fuel cell module 100 includes an insulating sheet 31 and an insulating plate 32 that are an insulating member 30 between the housing 20 and the high-voltage part HV.

The insulating member 30 is made of resin having an electrical insulating property, for example. The insulating sheet 31 is placed between the single cells and the housing 20 so as to cover the fuel cell stack 10, for example. The insulating plate 32 is placed between one of the terminal plates 11 and the housing 20 and between the other terminal plate 11 and a pressurizing plate 12, for example. The pressurizing plate 12 pressurizes the fuel cell stack 10 in the stacking direction of the single cells 1.

The housing 20 is made of metal, such as aluminum. More specifically the housing 20 is made of a brittle material, such as cast aluminum. The housing 20 has a rectangular box shape, for example. In the example of FIGS. 1 to 3, the housing 20 includes a first storage part 21 that stores the fuel cell stack 10 and a second storage part 22 that stores a power control unit (PCU) 40 that is placed laterally of the first storage part 21. In this way, the housing 20 has a two-stage structure. The second storage part 22 is a high-voltage component storage part to store high-voltage components, including the PCU 40.

The housing 20 includes a partition wall 23, a cleavage part 24 formed at the partition wall 23 that cleaves when the internal pressure of the housing 20 increases to a predetermined pressure, a high-rigidity part 25 formed at the partition wall 23 to surround the cleavage part 24, and a plurality of elongated protrusions 26 formed at the partition wall 23 outside of the high-rigidity part 25. The fuel cell module 100 of the present embodiment, which will be described later in details, has a major feature that the strength of the cleavage part 24 is lower than the strength of the elongated protrusions 26 and the strength of the high-rigidity part 25 is higher than the strength of the elongated protrusions 26 and can prevent the extension of a crack in the cleavage part 24. The strength of the partition wall 23 at each part means bending rigidity of the partition wall 23 at the part, for example.

In the example of FIGS. 1 to 3, the housing 20 has a pair of end plates 27 and 28 on both sides of the fuel cell stack 10 in the stacking direction of the single cells 1, and the end plates are a part of the partition wall 23. One of the end plates 27 is a lid to close an opening 20a at one end of the housing 20 to store the fuel cell stack 10. This end plate is fastened to the housing 20 with a plurality of bolts 27B for fixing.

The other end plate 28 is thicker than the neighboring partition wall 23 and is integral with the neighboring partition wall 23. This end plate has a screw hole 28a on which an adjustment bolt 29 is threadably mounted to adjust the position of the pressurizing plate 12. When the operator fastens the adjustment bolt 29 threadably mounted on the screw hole 28a of this end plate 28, the fuel cell stack 10 is pressurized in the stacking direction of the single cells 1 between the pressurizing plate 12 and the other plate 27 that closes the opening 20a of the housing 20 and via the pair of the terminal plates 11 and the pair of insulating plates 32.

The cleavage part 24 is a weak part having the lowest strength against the internal pressure of the housing 20 in the partition wall 23 of the housing 20. When the internal pressure of the housing 20 increases to a predetermined pressure due to some abnormality, the cleavage part 24 cleaves to release gas inside of the housing 20 to the outside. In this way, the cleavage part functions as a safety valve to suppress an increase of the internal pressure of the housing 20. That is, the material and the thickness of the cleavage part 24 are determined so that the cleavage part cleaves due to stress acting on it when the internal pressure of the housing 20 increases to a predetermined pressure. For instance, as shown in FIGS. 1 and 2, the cleavage part 24 is formed at the partition wall 23 at the bottom of the housing 20, and is opposed to a stack frame 200 that is an external structure to support the fuel cell module 100.

As shown in FIG. 3, the insulating member 30 covers the high-voltage part HV at least at a region opposed to the cleavage part 24 and exposes a part of the high-voltage part HV at a region other than the region opposed to the cleavage part 24. More specifically as shown in FIG. 3, the insulating sheet 31 as the insulating member 30 covers substantially the entirety of the fuel cell stack 10 so as to cover the single cells 1 as the high-voltage part HV at the region opposed to the cleavage part 24. Note here that the insulating sheet 31 does not have to cover the entire of the fuel cell stack 10, and may cover the single cells 1 as the high-voltage part HV at least at the region opposed to the cleavage part 24. The insulating sheet 31 and the insulating plate 32 as the insulating member 30 expose the edges of the terminal plates 11 as the high-voltage part HV at the region other than the region opposed to the cleavage part 24.

The high-rigidity part 25 surrounds the cleavage part 24 at the partition wall 23 of the housing 20. The high-rigidity part has a thickness 7.5 times or more a thickness of the cleavage part 24, for example. Although the shape of the high-rigidity part 25 is not limited especially, it has a rectangular cross-sectional shape, for example. In the example of FIG. 2, the cleavage part 24 of the fuel cell module 100 has a round shape and the high-rigidity part 25 has an annular shape when the partition wall 23 of the housing 20 at the bottom having the cleavage part 24 and the high-rigidity part 25 is viewed in the thickness direction.

The plurality of elongated protrusions 26 protrudes from the outer surface of the partition wall 23 in the thickness direction of the partition wall 23 at a part outside of the region of the partition wall 23 surrounded by the high-rigidity part 25. The elongated protrusions 26 have a grid-like shape that extends vertically and horizontally along the outer surface of the partition wall 23, for example. That is, the housing 20 has the grid-like elongated protrusions 26 at a part of the partition wall 23 other than the cleavage part 24 and the high-rigidity part 25. In the example of FIGS. 1 to 3, the end plates 27 and 28 as a part of the partition wall 23 of the housing 20 may not have the elongated protrusions 26.

In the fuel cell module 100 of the present embodiment, the partition wall 23 of the housing 20 has a thickness at the elongated protrusions 26 larger than at a part other than the elongated protrusions 26 at a part other than the cleavage part 24, the high-rigidity part 25 and the end plates 27 and 28. The thickness, the width and the interval of the elongated protrusions 26 may be determined based on the calculation of strength of the housing 20 so that the housing 20 can have pressure resistance to be resistant to a maximum value of the internal pressure of the housing 20 that is expected after cleavage of the cleavage part 24. In the fuel cell module 100 of the present embodiment, the partition wall 23 of the housing 20 is the thinnest at the cleavage part 24 and the thickness of the high-rigidity part 25 is larger than the thickness of the elongated protrusions 26, for example.

The following describes the action of the fuel cell module 100 according to the present embodiment.

As stated above, the fuel cell module 100 of the present embodiment is mounted in a fuel-cell vehicle, for example, and operates as a power supply for vehicle that supplies electricity to a motor to drive the fuel-cell vehicle. For widespread use of fuel-cell vehicles, it is important to lower the cost of the vehicles. The cost of the fuel cell module 100 mounted in such a fuel-cell vehicle also has to be lowered.

If some abnormality occurs at the fuel cell module 100 and causes an increase of the internal pressure of the housing 20 that stores the fuel cell stack 10, the fuel cell module has to prevent the exposure of the high-voltage part HV in the housing 20 and has to secure the safety of passengers. The fuel cell module therefore has to prevent a crack in the housing 20 in size that a human finger can be inserted or flying of a broken piece of the housing 20.

As stated above, the fuel cell module 100 of the present embodiment includes the fuel cell stack 10, and the housing 20 that stores the fuel cell stack 10. The housing 20 includes the partition wall 23, the cleavage part 24 formed at the partition wall 23 that cleaves when the internal pressure of the housing 20 increases to a predetermined pressure, the high-rigidity part 25 formed at the partition wall 23 to surround the cleavage part 24, and the plurality of elongated protrusions 26 formed at the partition wall 23 outside of the high-rigidity part 25. The strength of the cleavage part 24 is lower than the strength of the elongated protrusions 26 and the strength of the high-rigidity part 25 is higher than the strength of the elongated protrusions 26 and can prevent the extension of a crack in the cleavage part 24.

With this configuration, when the internal pressure of the housing 20 increases to a predetermined pressure due to some abnormality, a crack is generated at the cleavage part 24 having the lowest strength before a part of the partition wall 23 having the elongated protrusions 26 or the high-rigidity part 25, and the cleavage part 24 cleaves. This can release gas inside of the housing 20 from the crack of the cleavage part 24 and can suppress an increase of the internal pressure of the housing 20. In this way, the safety of the fuel cell module 100 can be secured.

More specifically when the internal pressure of the housing 20 increases due to some abnormality, the internal pressure of the housing 20 acts on the entire face of the partition wall 23 of the housing 20 uniformly as distributed load. When the internal pressure of the housing 20 increases with the passage of time to be a predetermined pressure, the cleavage part 24, which is a weak part having the lowest strength of the partition wall 23, generates a crack. A part of the partition wall 23 of the housing 20 other than the cleavage part 24, which includes the high-rigidity part 25 and the elongated protrusions 26, has rigidity higher than that of the cleavage part 24, and so does not generate a crack.

A crack in the cleavage part 24 extends with an increase of the internal pressure of the housing 20 and enlarges so as to reduce the internal pressure of the housing 20, and the high-rigidity part 25 surrounding the cleavage part 24 prevents the excessive extension of the crack. After that, gas inside of the housing 20 can be released from the extended crack of the cleavage part 24, which can reduce the internal pressure of the housing 20 and can prevent a breakage of the housing 20.

During an increase of the internal pressure of the housing 20, the cleavage part 24 of the partition wall 23 can cleave limitedly. This can prevent flying of a broken piece and so can secure the safety of passengers. The cleavage part 24 of the partition wall 23 can keep a sealed structure of the housing 20 until the internal pressure of the housing 20 increases to a predetermined pressure. In this way, the safety and the weatherability of the fuel cell module 100 can improve.

The strength of the high-rigidity part 25 surrounding the cleavage part 24 is higher than the strength of the elongated protrusions 26 and the high-rigidity part 25 has the strength that can prevent the extension of a crack in the cleavage part 24. This can prevent a crack generated at the cleavage part 24 and reaching the high-rigidity part 25 from extending beyond the high-rigidity part 25. This can prevent the exposure of the high-voltage part HV, which includes the single cells 1 of the fuel cell stack 10 stored inside of the housing 20, due to an excessively extending crack, and so can prevent a crack generated at the housing 20 in size that a human finger can be inserted. In this way, the safety of passengers can be secured.

For the housing 20 made of cast aluminum, the number of the components can be reduced by casting the partition wall 23 having the cleavage part 24, the high-rigidity part 25 and the elongated protrusions 26. The manufacturing process can be thus simplified, and the manufacturing cost can be reduced. Such a housing 20 can be lighter in weight. For the housing 20 made of a brittle material, such as cast aluminum, it is difficult to control the generation of a crack in the cleavage part 24 because a crack extends instantly. The high-rigidity part 25 surrounding the cleavage part 24 can prevent a crack from extending beyond the cleavage part 24.

As stated above, the fuel cell module 100 of the present embodiment includes the insulating sheet 31 and the insulating plate 32 that are the insulating member 30 between the housing 20 and the high-voltage part HV including the single cells 1 of the fuel cell stack 10. The insulating member 30 covers the high-voltage part HV at least at a region opposed to the cleavage part 24 and exposes a part of the high-voltage part HV at a region other than the region opposed to the cleavage part 24. This can prevent the exposure of the high-voltage part HV due to a crack generated during cleaving of the cleavage part 24. This can reduce the risk of a contact between the high-voltage part HV and a human or components outside of the housing 20 during cleaving of the cleavage part 24.

As stated above, in the fuel cell module 100 of the present embodiment, the thickness of the high-rigidity part 25 is 7.5 times or more the thickness of the cleavage part 24. With this configuration, the high-rigidity part 25 can have sufficient strength. In the ignition test to ignite hydrogen gas charged in the housing 20 to increase the internal pressure of the housing 20 and so cleave the cleavage part 24, the high-rigidity part 25 can prevent the extension of a crack in the cleavage part 24 reliably. If some abnormality occurs and causes ignition to hydrogen charged in the housing 20, cleavage at the cleavage part 24 can reduce the internal pressure of the housing 20 and the exposure of the high-voltage part HV inside of the housing 20 can be prevented. In this way, the safety of the fuel cell module 100 can improve.

In the fuel cell module 100 of the present embodiment, the plurality of elongated protrusions 26 of the partition wall 23 of the housing 20 protrudes from the outer surface of the partition wall 23 in the thickness direction of the partition wall 23, and the elongated protrusions 26 have a grid-like shape that extends vertically and horizontally along the outer surface of the partition wall 23. Such grid-like elongated protrusions 26 reinforce a part of the partition wall 23 other than the high-rigidity part 25 and the cleavage part 24, and so the strength of the partition wall improves. This can prevent a breakage of the partition wall 23 at a part other than the cleavage part 24 before the internal pressure of the housing 20 reaches a predetermined pressure to cleave the cleavage part 24.

In the fuel cell module 100 of the present embodiment, the partition wall 23 of the housing 20 is the thinnest at the cleavage part 24 and the thickness of the high-rigidity part 25 is larger than the thickness of the elongated protrusions 26. This means that, in the partition wall 23 of the housing 20, the strength of the cleavage part 24 is lower than the strength of the elongated protrusions 26 and the strength of the high-rigidity part 25 is higher than the strength of the elongated protrusions 26. If some abnormality occurs and causes the internal pressure of the housing 20 to increase a predetermined pressure, the cleavage part 24 cleaves to release gas inside of the housing 20. This can suppress an increase of the internal pressure of the housing 20 and can secure the safety of the fuel cell module 100.

In the fuel cell module 100 of the present embodiment, the cleavage part 24 has a round shape and the high-rigidity part 25 has an annular shape, for example, when the partition wall 23 of the housing 20 is viewed in the thickness direction. This can suppress concentration of stress at the high-rigidity part 25 when a crack occurs in any direction of the cleavage part 24, and so can prevent a crack in the high-rigidity part 25.

In the fuel cell module 100 of the present embodiment, the cleavage part 24 of the partition wall 23 of the housing 20 is opposed to an external structure, such as the stack frame 200. In this way, the cleavage part 24 is close to and opposed to an external structure, which can prevent flying of a broken piece during cleaving of the cleavage part 24. This also can reduce the risk of a contact between the high-voltage part HV in the housing 20 and a human or components outside of the housing 20 via a crack or an opening at the cleavage part 24.

As stated above, the present embodiment provides a fuel cell module 100 capable of preventing the excessive extending of a crack in the cleavage part 24 when the cleavage part 24 cleaves to reduce the internal pressure of the housing 20 that stores the fuel cell stack 10 and of preventing the exposure of the high-voltage part HV inside of the housing 20.

The fuel cell module 100 of the present embodiment is not limited to the aforementioned structure. The following describes modified examples of the fuel cell module 100 according to the present embodiment.

Figure 4:
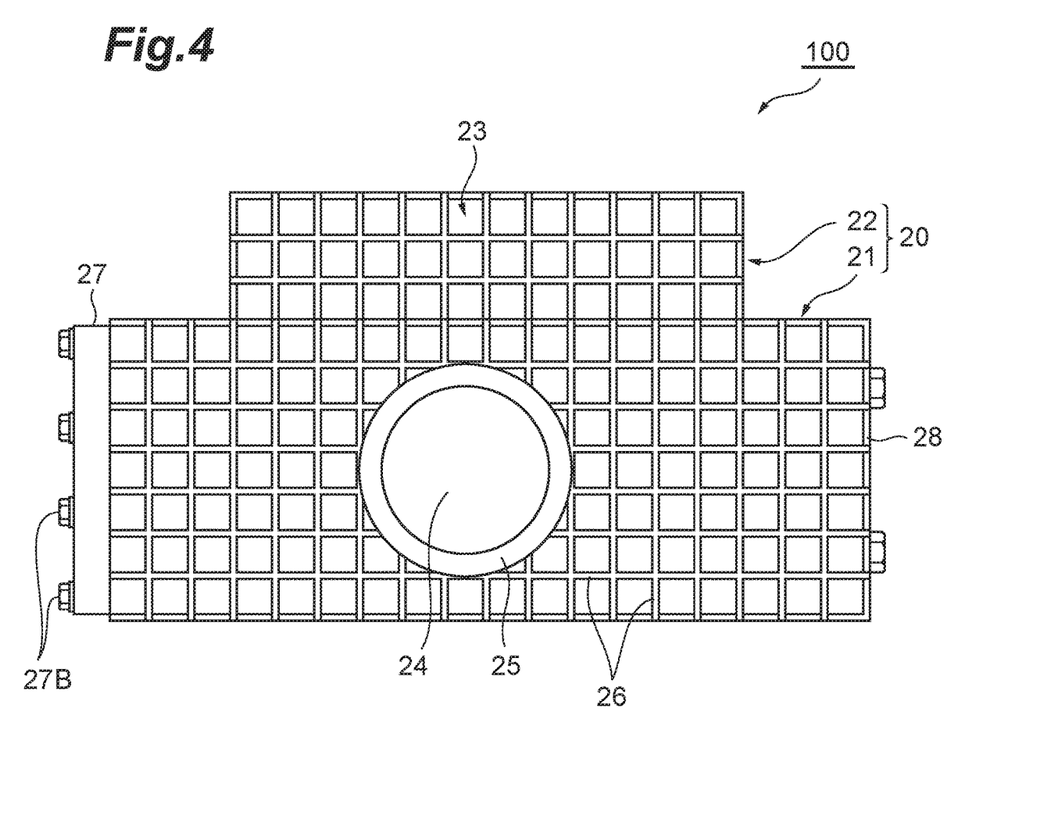
FIG. 4 is a front view of a modified example of the fuel cell module in FIG. 1.
Figure 5:
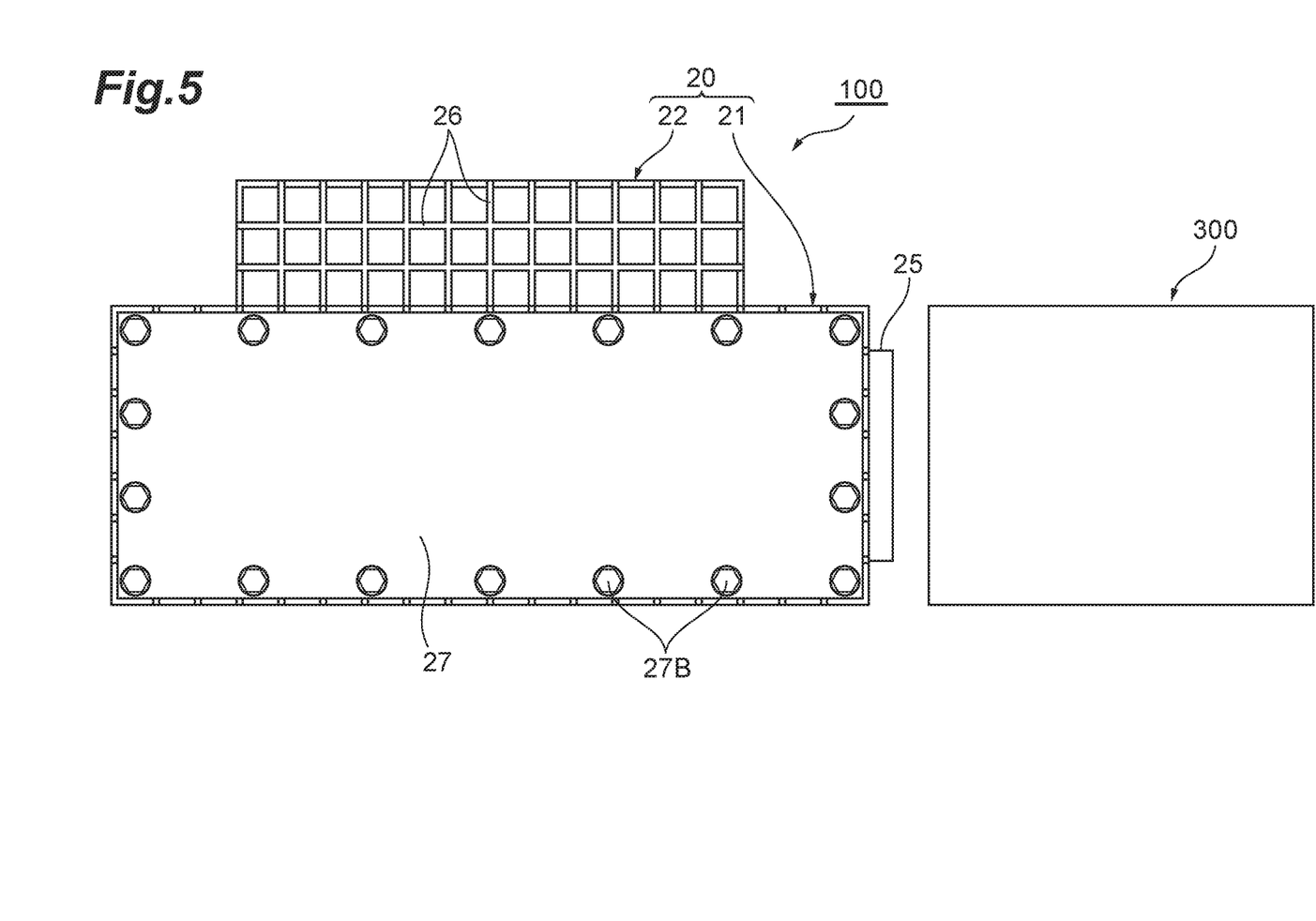
FIG. 5 is a side view of the fuel cell module in FIG. 4.

FIGS. 4 and 5 are a front view and a side view, respectively, of a modified example of the fuel cell module 100 in FIGS. 1 to 3. In the modified example of FIGS. 4 and 5, the fuel cell module 100 has a cleavage part 24 and a high-rigidity part 25 on the partition wall 23 at a lateral part of the housing 20 instead of on the partition wall 23 at a bottom of the housing 20. The cleavage part 24 of this fuel cell module 100 is opposed to a component 300 that is an external structure adjacent to the fuel cell module. In this case also, the fuel cell module can have similar advantageous effects to those of the fuel cell module 100 in FIGS. 1 to 3.

Figure 6:
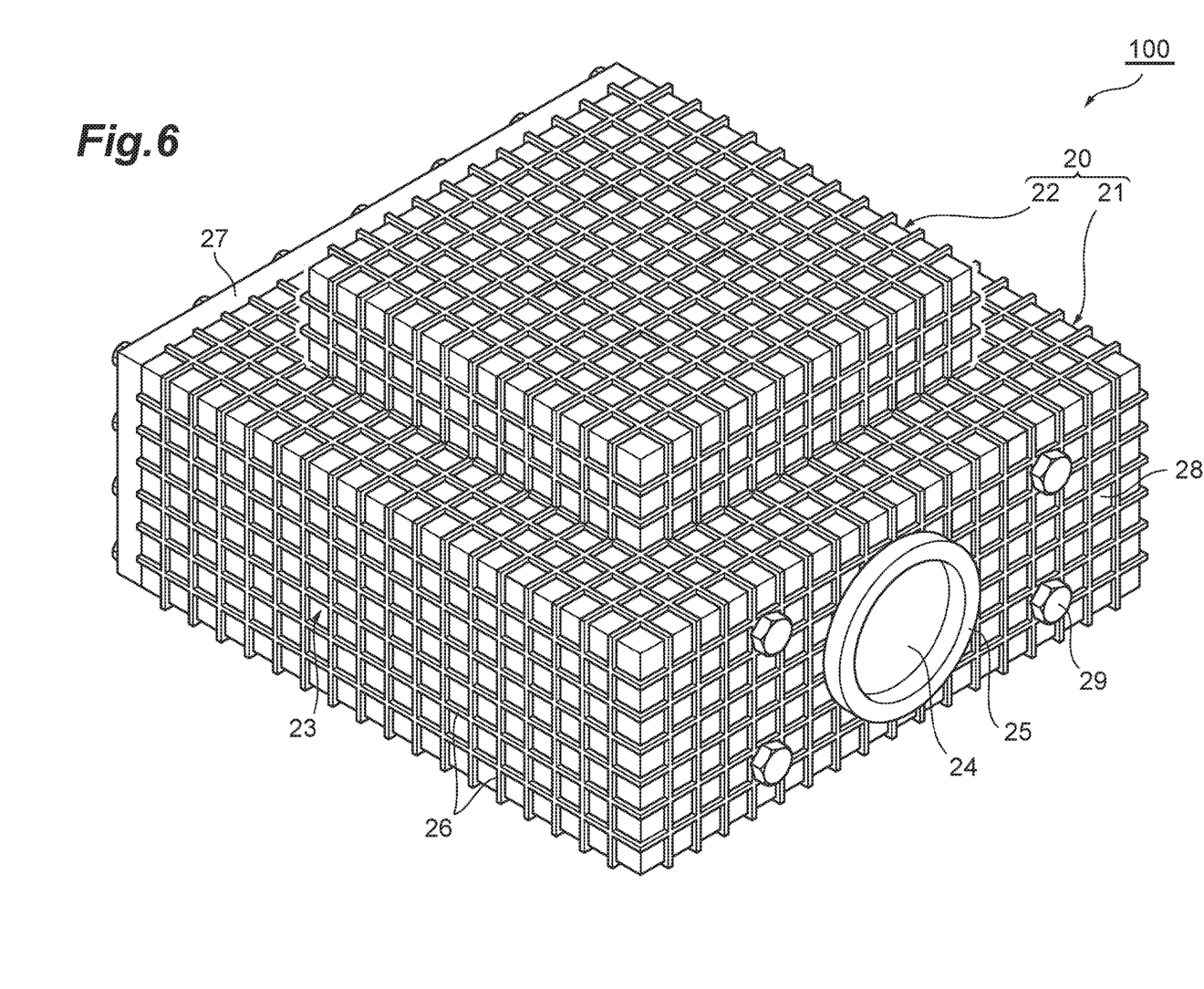
FIG. 6 is a perspective view of a modified example of the fuel cell module in FIG. 1.
Figure 7:
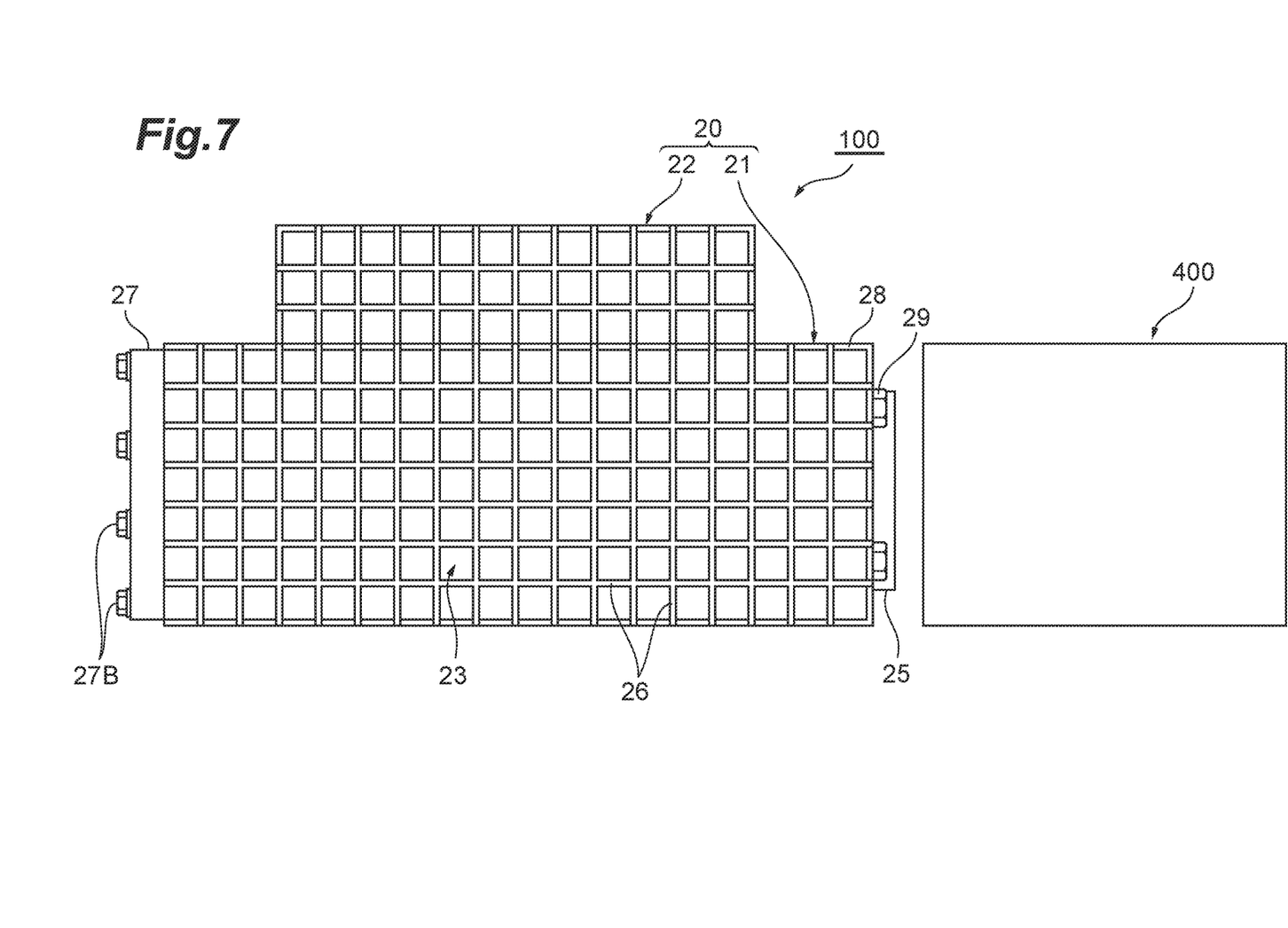
FIG. 7 is a front view of the fuel cell module in FIG. 6.

FIGS. 6 and 7 are a perspective view and a front view, respectively, of a modified example of the fuel cell module 100 in FIGS. 1 to 3. In the modified example of FIGS. 6 and 7, the fuel cell module 100 has a cleavage part 24 and a high-rigidity part 25 on an end plate 28 that is the partition wall 23 at a lateral part of the housing 20 instead of on the partition wall 23 at a bottom of the housing 20. The cleavage part 24 of this fuel cell module 100 is opposed to a component 400 that is an external structure adjacent to the fuel cell module. In this case also, the fuel cell module can have similar advantageous effects to those of the fuel cell module 100 in FIGS. 1 to 3.

As stated above, the fuel cell module 100 of the modified examples and the embodiment as stated above has the advantageous effect that the position of the cleavage part 24 on the partition wall 23 of the housing 20 can be changed flexibly.

That is a detailed description of the embodiments of the present disclosure. The specific configuration of the present disclosure is not limited to the above-stated embodiment, and the design may be modified variously without departing from the spirits of the present disclosure. The present disclosure also covers such modified embodiments.

EXAMPLES

Fuel cell modules of Examples 1 and 2 having the structure similar to the fuel cell module described in the above embodiment were manufactured. These fuel cell modules as Examples 1 and 2 had the partition wall of the housing made of cast aluminum. In the fuel cell modules as Examples 1 and 2, the high-rigidity part of the partition wall of the housing had a thickness that was 10 times and 7.5 times, respectively, the thickness of the cleavage part of the partition wall.

Next, fuel cell modules as Comparative Examples 1 to 3 were manufactured, which were similar to the fuel cell modules of Examples 1 and 2 other than that the high-rigidity part of the partition wall of the housing had a thickness that was 5 times, 4 times and 1 time, respectively, the thickness of the cleavage part.

Next, an ignition test to ignite hydrogen gas charged inside of the housing of the fuel cell module was conducted to determine whether the effect of suppressing the extension of a crack in the cleavage part was obtained or not. The following Table 1 shows the ratio of the thickness of the high-rigidity part and the thickness of the cleavage part of the fuel cell modules in Examples 1 and 2 and Comparative Examples 1 to 3 (High-rigidity part thickness/Cleavage part thickness) and their effect of suppressing extension of a crack in the cleavage part during the ignition test.

TABLE 1

|  | Ex. 1 | Ex. 2 | Comp. Ex. 1 | Comp. Ex. 2 | Comp. Ex. 3 |
| --- | --- | --- | --- | --- | --- |
| High-rigidity part thickness Cleavage part thickness | 10 | 7.5 | 5 | 4 | 1 |
| Crack extension suppressed? | Yes | Yes | No | No | No |

For the "Crack extension suppressed?" in Table 1, "Yes" shows that a crack in the cleavage part did not extend to other parts, and "No" shows that a crack in the cleavage part extended to another part. These result shows that the fuel cell modules as Examples 1 and 2 having the thickness of their high-rigidity parts 7.5 times or more the thickness of their cleavage parts had an effect of suppressing extension of the crack. On the contrary, in the fuel cell modules as Comparative Examples 1 to 3 having the thickness of their high-rigidity parts less than 7.5 times the thickness of their cleavage parts, such an effect of suppressing extension of the crack was not found.

DESCRIPTION OF SYMBOLS

1 Single cell
10 Fuel cell stack
11 Terminal plate
20 Housing
23 Partition wall
24 Cleavage part
25 High-rigidity part
26 Elongated protrusion
30 Insulating member
100 Fuel cell module
200 Stack frame (external structure)
300 Component (external structure)
400 Component (external structure)
HV High-voltage part

What is claimed is:

1. A fuel cell module, comprising a fuel cell stack; and a housing that stores the fuel cell stack,
    the housing including a partition wall exposed to an outside of the fuel cell module, a cleavage part on the partition wall that cleaves when an internal pressure of the housing increases to a predetermined pressure, a high-rigidity part on the partition wall that surrounds the cleavage part, and a plurality of elongated protrusions on the partition wall outside of the high-rigidity part,
    the cleavage part having strength lower than strength of the elongated protrusions and the high-rigidity part having strength higher than the strength of the elongated protrusions and the high-rigidity part strength being sufficient to prevent extension of a crack in the cleavage part to extend to the high-rigidity part.

2. The fuel cell module according to claim 1, further comprising an insulating member between the housing and a high-voltage part including single cells of the fuel cell stack, and the insulating member covers the high-voltage part at least at a region opposed to the cleavage part and exposes a part of the high-voltage part at a region other than the region opposed to the cleavage part.

3. The fuel cell module according to claim 2, wherein the high-voltage part includes terminal plates at both ends of the fuel cell stack in a stacking direction of the single cells.

4. The fuel cell module according to claim 1, wherein the high-rigidity part has a thickness 7.5 times or more a thickness of the cleavage part.

5. The fuel cell module according to claim 1, wherein the plurality of elongated protrusions protrudes from an outer surface of the partition wall in a thickness direction of the partition wall and the elongated protrusions have a grid-like shape that extends vertically and horizontally along the outer surface of the partition wall.

6. The fuel cell module according to claim 1, wherein the partition wall is the thinnest at the cleavage part, and the high-rigidity part has a thickness larger than a thickness of the elongated protrusions.

7. The fuel cell module according to claim 1, wherein the cleavage part has a round shape and the high-rigidity part has an annular shape when the partition wall is viewed in a thickness direction.

8. The fuel cell module according to claim 1, wherein the cleavage part is opposed to an external structure.

9. The fuel cell module according to claim 1, wherein the cleavage part is located on a bottom portion of the housing.

10. The fuel cell module according to claim 1 wherein the cleavage part is located on a lateral part of the housing.

* * * * *

UNITED STATES PATENT AND TRADEMARK OFFICE
CERTIFICATE OF CORRECTION

PATENT NO. : 10,741,867 B2
APPLICATION NO. : 16/195198
DATED : August 11, 2020
INVENTOR(S) : Masahiro Katayama Page 1 of 1

It is certified that error appears in the above-identified patent and that said Letters Patent is hereby corrected as shown below:

On the Title Page

Item (73), the following should be entered after item (72):
(73) Assignee: TOYOTA JIDOSHA KABUSHIKI KAISHA, Toyota (JP)

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*